METHOD AND APPARATUS FOR CORRECTING ERRORS IN MUTILATED TEXT

Filed May 4, 1962 11 Sheets-Sheet 1

INVENTORS L. D. HARMON
E. J. SITAR
BY [signature]
ATTORNEY

| | $L_3$ IS OK | $L_3$ IS IN ERROR 1 | 2 | 3 | 4 | 5 |
|---|---|---|---|---|---|---|
| $P_{12} \geq T$ | | | 1 | | | |
| $P_{23} \geq T$ | 1 | 0 | 0 | 1 | 0 | 1 |
| $P_{34} \geq T$ | 1 | 0 | 1 | 0 | 1 | 0 |
| $P_{45} \geq T$ | | | | 1 | | |
| $P_{L3} > P_{L2}$ | | | 1 | | | |
| $P_{L3} > P_{L4}$ | | | | 1 | | |
| $P_{L3} = P_{L2}$ | | | | | 1 | |
| $P_{L3} = P_{L4}$ | | | | | | 1 |
| $P_{34} < P_{12}$ | | | | | 1 | |
| $P_{23} < P_{45}$ | | | | | | 1 |

DECISION

| INPUT | a | b | c | d | e | f | g | h | i | j | k | l | m | n | o | p | q | r | s | t | u | v | w | x | y | z | - |
|---|---|---|---|---|---|---|---|---|---|---|---|---|---|---|---|---|---|---|---|---|---|---|---|---|---|---|---|
| a | 27 | | 2 | | | | | | | | | | | | | | | | 1 | | | | | | | | |
| b | | 5 | | | | | | 3 | | | | 2 | | | | | | | | | | | | | | | |
| c | | | 8 | | 1 | | | | | | | | | | | | | | | | | | | | | | |
| d | | | | 9 | | | | | | | | | | | | | | | | | | | | | | | |
| e | | | 1 | | 30 | | | | | | | | | | | | | | | | | | | | | | 2 |
| f | | | | | | 14 | | | | | | | | | | | | | | | | | | | | | |
| g | | | | | | | 9 | | | | | | | | | | | | | | | | | | | | |
| h | | | | | | | | 11 | | | 2 | | | | | | | | | 1 | | | | | | | |
| i | | | | | | | | | 20 | | | | | | | | | 1 | | | | | | | | | 1 |
| j | | | | | | | | | | 10 | | | | | | | | | | | | | | | | | |
| k | | | | | | | | 2 | | | 8 | | | | | | | | | | | | | | | | |
| l | | | | | | | | 1 | | | | 8 | | | | | | | | | | | | | | | |
| m | | | | | | | | | | | | | 9 | | | | | | | | | | | | | | |
| n | | | | | | | | | | | | | 3 | 27 | | | | 1 | | | | | | | | | 3 |
| o | | | | | | | | | | | | | | | 30 | | | | | | | | 2 | | | | 1 |
| p | | | | | | | | | | | | | | | | 10 | | | | | | | | | | | |
| q | | | | | | | 1 | | | | | | | | | | 9 | | | | | | | | | | |
| r | | | | | | | | | | | | | | 2 | | | | 16 | | | | | | | | | 5 |
| s | | | | | | | | | | | | | | | | | | | 18 | | | | | | | | |
| t | | | | | | | | | | | | | | | | | | | | 19 | | | | | | | |
| u | | | 1 | | | | | | | | | | | | | | | | | | 15 | | 1 | | | | 2 |
| v | | | | | | | | | | | | | | | | | | 4 | | | | 4 | 1 | | | | |
| w | | | | | | | | | | | | | | | | | | | | | 2 | 1 | 5 | | | | 1 |
| x | | | | | | | | | | | | | | | | | | | | | | | | 15 | | | |
| y | | | | | | | | | | | | | | | | | | | | | | | | | 15 | | |
| z | | | | | | | | | | | | | | | | | | | | | | | | | 1 | 8 | |
| - | | | | | | | | | | | | | | | | | | | | | | | | | | | |

- = NO DECISION

INVENTORS L.D. HARMON
E.J. SITAR
BY G. E. Hirsch Jr.
ATTORNEY

METHOD AND APPARATUS FOR CORRECTING ERRORS IN MUTILATED TEXT
Filed May 4, 1962 11 Sheets-Sheet 3
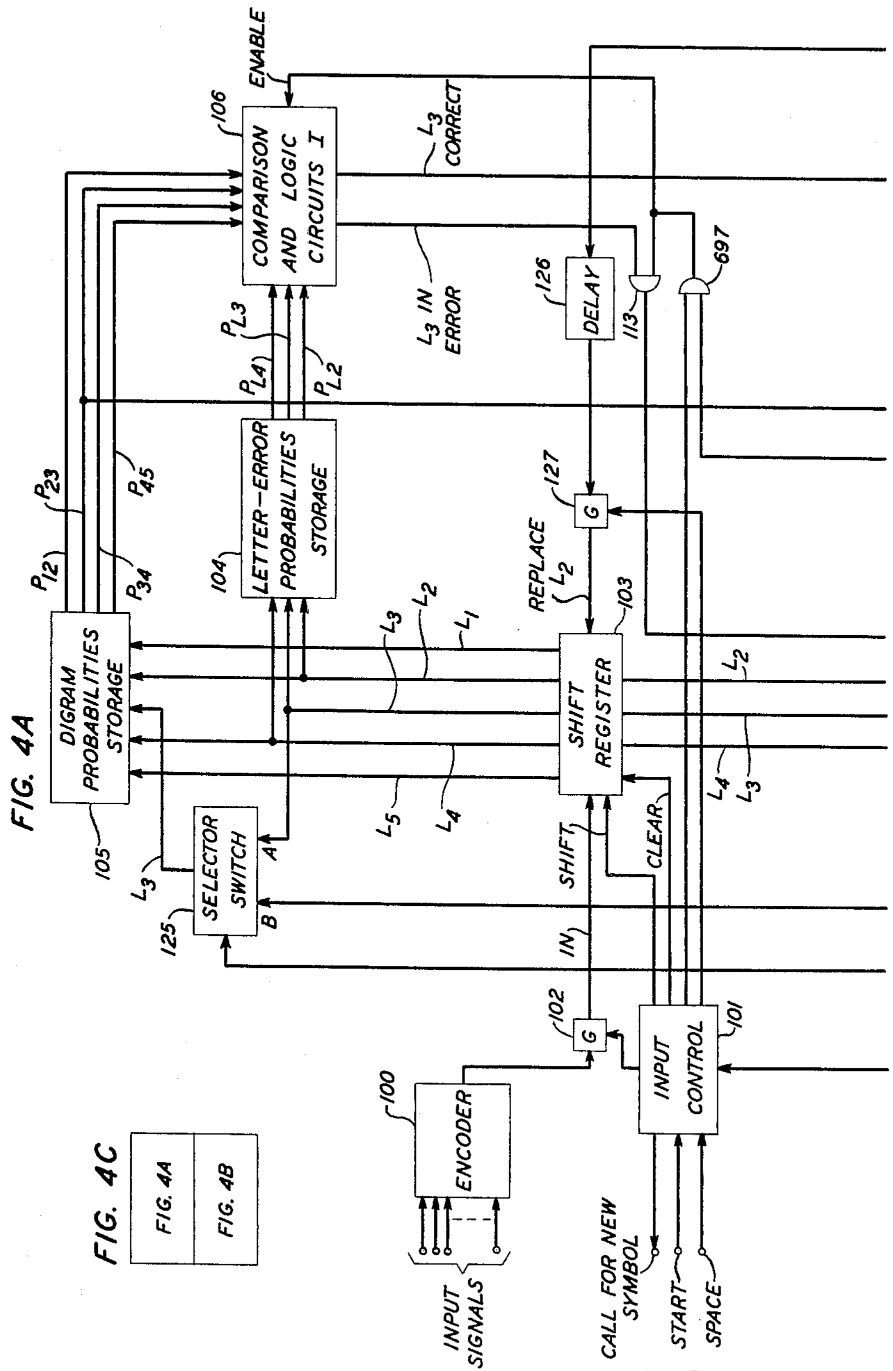
INVENTORS L. D. HARMON
E. J. SITAR
BY G. E. Hirsch Jr.
ATTORNEY INVENTORS L. D. HARMON
E. J. SITAR
BY G. E. Hirsch
ATTORNEY INVENTORS L. D. HARMON
E. J. SITAR
BY
G. E. Hirsch
ATTORNEY

METHOD AND APPARATUS FOR CORRECTING ERRORS IN MUTILATED TEXT

Filed May 4, 1962 11 Sheets-Sheet 6

INVENTORS L. D. HARMON
E. J. SITAR
BY G. E. Hirsch Jr.
ATTORNEY

METHOD AND APPARATUS FOR CORRECTING ERRORS IN MUTILATED TEXT

Filed May 4, 1962 11 Sheets-Sheet 7

| FIG. 7A | FIG. 7B |
|---|---|

INVENTORS L. D. HARMON
E. J. SITAR
BY G. E. Hirsch
ATTORNEY

METHOD AND APPARATUS FOR CORRECTING ERRORS IN MUTILATED TEXT
Filed May 4, 1962
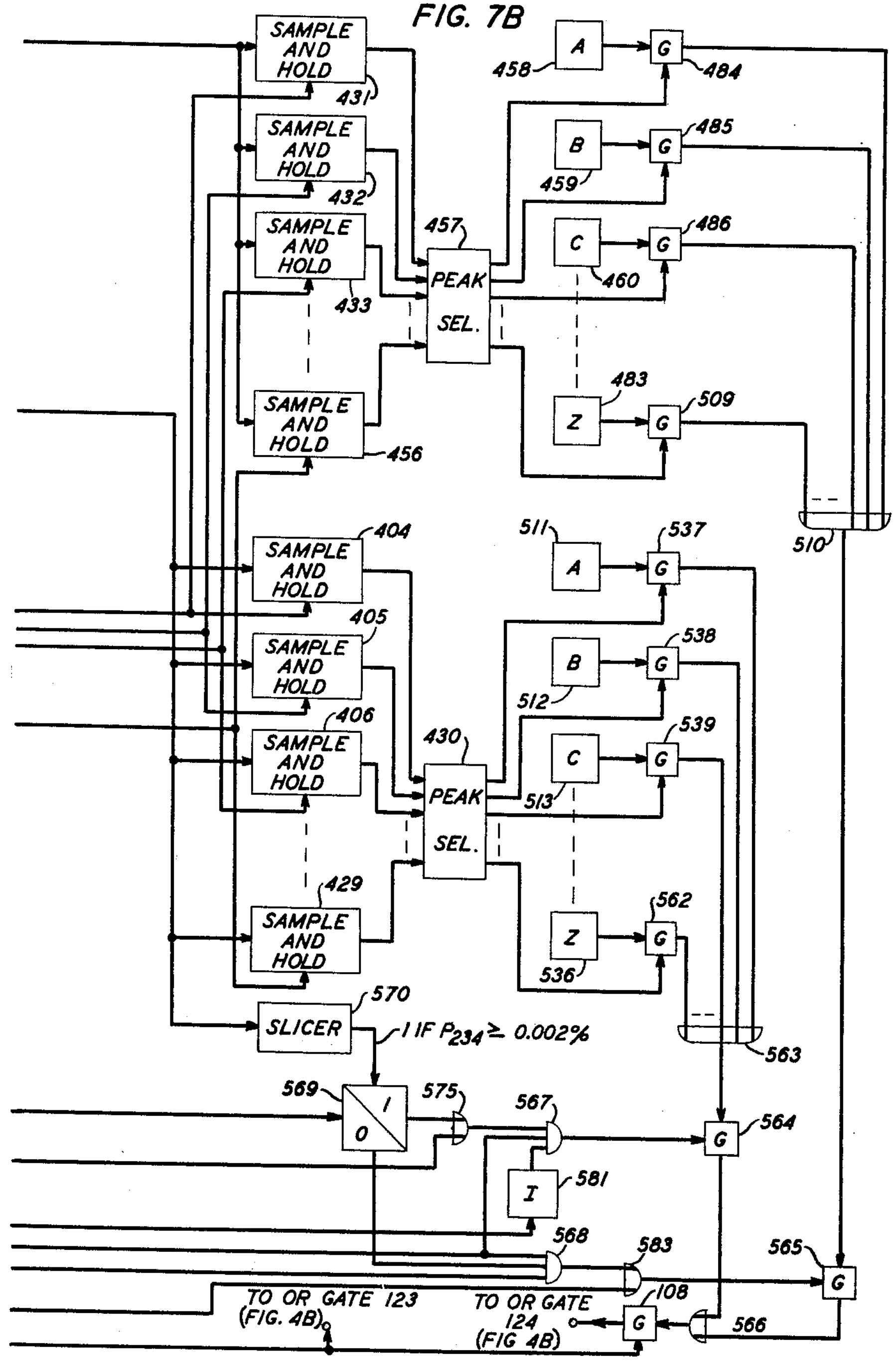
INVENTORS L. D. HARMON
E. J. SITAR
BY G. E. Hirsch Jr.
ATTORNEY

METHOD AND APPARATUS FOR CORRECTING ERRORS IN MUTILATED TEXT

Filed May 4, 1962

INVENTORS L. D. HARMON
E. J. SITAR

BY G. E. Hirsch Jr.

ATTORNEY

INVENTORS L.D. HARMON
E.J. SITAR
BY
C.E. Hirsch Jr.
ATTORNEY

METHOD AND APPARATUS FOR CORRECTING ERRORS IN MUTILATED TEXT
Filed May 4, 1962
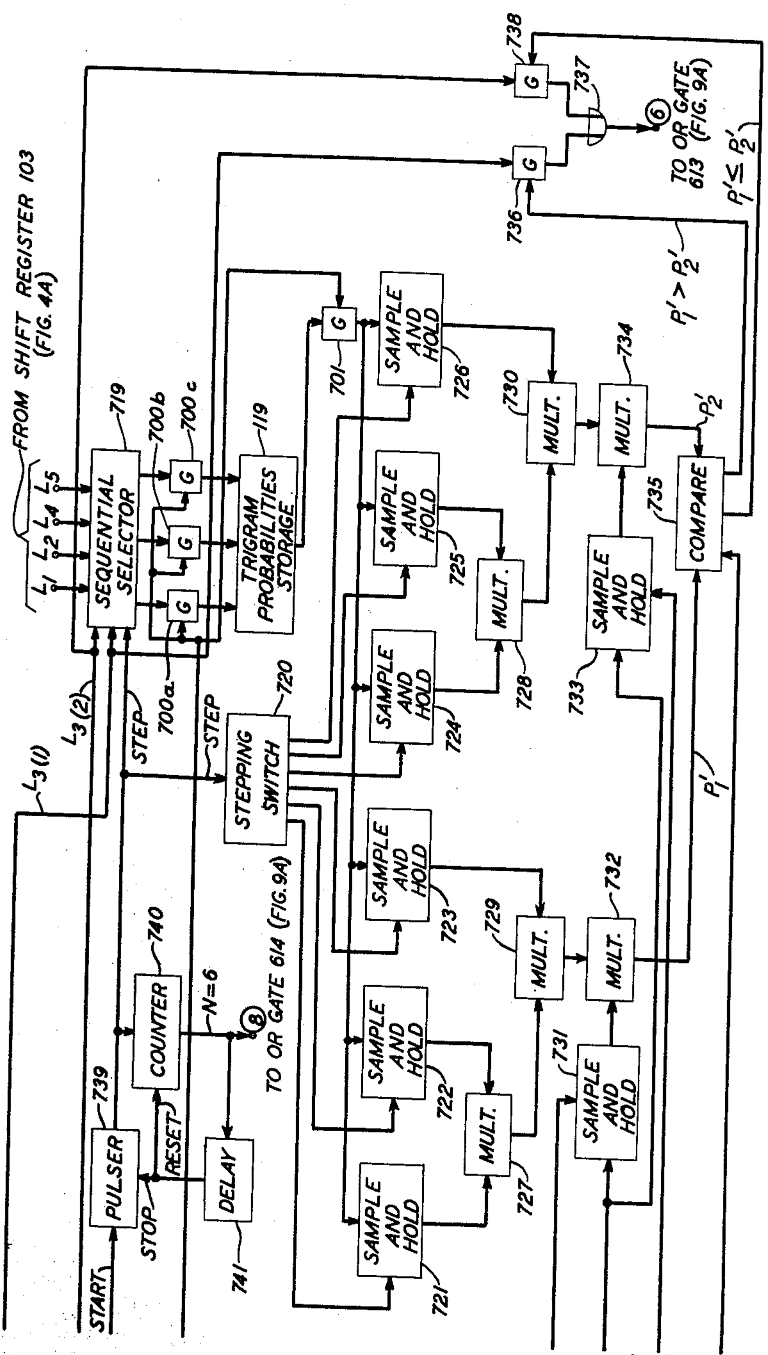
INVENTORS L. D. HARMON
E. J. SITAR
BY
A. E. Hirsch Jr.
ATTORNEY 3,188,609

METHOD AND APPARATUS FOR CORRECTING ERRORS IN MUTILATED TEXT

Leon D. Harmon, Warren Township, Somerset County, and Edward J. Sitar, Plainfield, N.J., assignors to Bell Telephone Laboratories, Incorporated, New York, N.Y., a corporation of New York Filed May 4, 1962, Ser. No. 192,465
7 Claims. (Cl. 340—146.1)

This invention relates to data processing and, more particularly, to methods and apparatus for detecting, locating, and correcting errors in sequences of letters in meaningful combinations, for example, in sequences purported to be words in the English language.

Machine recognition of symbols, patterns, characters, and the like has developed to such a state that much reliance is placed on these devices for translating human language into what has come to be known as machine language. For the most part, recognition apparatus may be designed with arbitrarily high accuracy so long as one is willing to utilize a sufficient number of logic operations. Nevertheless, in practice, it has been found that such machines regularly fail to recognize certain symbols or patterns particularly if they are formed carelessly. Thus machine reading apparatus designed to recognize cursive script, for example, is more prone to error than similar apparatus designed to read only machine- or hand-printed data of a certain specified type font. The latter apparatus, however, also fails occasionally when smudges or smears are present in the textual material, or a momentary failure occurs in one of the logic circuits. In cases where electrical representations of individual letters, e.g., code symbols, are transmitted over long distances, errors may occur either in the coding or decoding process, or as a result of transmission line difficulties. In all events such errors cannot be tolerated. Perhaps they can be avoided if sufficient care and effort is placed upon the design of the equipment, but to do so often becomes economically unfeasible. It is in accordance with the present invention to correct errors in electrical representations of meaningful combinations of patterns from any source so that a more realistic balance between accuracy of performance of the over-all system and economic feasibility may be maintained.

It is thus a primary object of the present invention to detect, locate, and correct individual letter errors in mutilated text.

It is another object of the invention to augment automatic apparatus which provides as an output an electrical indication of discrete letters in the context of meaningful messages so that the accuracy of the apparatus may be increased substantially in an economical fashion.

The present invention turns to account a number of observations concerning the English language but, of course, the principles are equally applicable to virtually any language so long that it has definable statistical constraints.

One way of correcting errors in mutilated text is, of course, merely to examine the text and substitute for detected errors a letter that has a statistically higher probability of occurrence for the language involved. The present invention instead relies primarily on the prior history of performance of the automatic reading or decoding apparatus, thus to achieve substantially improved performance. Contextual statistics are used only to aid in locating possible errors in the text and occasionally, should the prior history of performance data prove unsatisfactory, to aid in selecting a suitable replacement letter. The required storage and logic apparatus is considerably simplified, and yet a remarkably high performance recorded is achieved.

Errors can be either due to the substitution of one letter for another, or due to the failure of the input apparatus completely to identify a particular character, resulting in a deletion error. A substitution error is detected by joining each letter of a word with its flanking neighbors, that is, by forming so-called "digrams" and testing each digram with a stored table of digram probabilities of the language in question, for example, the English language. It has been found that the probabilities of occurrence of the digrams formed with an errant letter are generally distinguishably lower than the probabilities associated with digrams in error-free words. If any of these digrams fail to show a likelihood of occurrence which exceeds a preselected threshold value, the threshold being selected from a large sample of typical probabilities, the digram(s) in question is (are) said to be in error. It then remains to determine which of the two letters of such a digram is at fault.

The location of this error is accomplished in two ways. If two "below threshold" digrams occur adjacently, the letter common to both is said to be in error. If only one digram is below threshold, location is accomplished by consulting the statistical record of the input device to see which one of the letters of the digram in question has the highest probability of being in error. If the digram probability tests indicate above-threshold digrams, no further processing is required and the letter is immediately transferred to an output circuit.

Similarly, if a blank (distinguished from a space symbol) is present, which of course is immediately noticed, it is arbitrarily concluded that an error has been made and that further processing is required.

Once an error of substitution has been located or a blank detected, additional processing is carried on to correct the error. Initially, the prior statistical record of the input device is examined, and all of the antecedent letters which the machine regularly substitutes for the letter in question are examined. If there is no antecedent, it is concluded that the letter is not in error; the error detection apparatus has given a "false alarm." Accordingly, the letter is transmitted directly to the output circuit. If there is only one antecedent, this letter immediately is selected as the correct one and utilized in the output. For the case in which more than one possible antecedent letter exists, each one is used to form a "trigram" with the letters flanking the letter in error; i.e., a three letter combination. Here reliance is made upon the natural frequency of occurrence of such a trigram in the English language. That antecedent letter for which the highest trigram probability is found is selected as the proper replacement letter. If the trigram probabilities for all of the antecedent letters are below a selected threshold level, resort is made to individual digram probabilities formed with the antecedent and the letter of the sequence immediately preceding it. That antecedent letter which yields the highest digram probability is selected as the fill-in value.

A similar contextual procedure is followed for blanks. Here the prior-performance data generally indicates a number of possible letters for which the input system occasionally fails to make any decision whatsoever. In this case, trigram tests are made using each of the possible antecedents. If only one probability is greater than zero, the responsible antecedent is selected. If, however, more than one antecedent yields trigram probabilities greater than zero, the highest two are selected and are processed further to find the best possible fill-in. In essence, each of the two highest probability antecedents is used to obtain three trigrams formed, respectively, with the preceding two, the flanking, and the following two letters in the word. The probability for each of these trigrams is established, as is the probability that the claimed antecedent may be recognized as a blank. Then, for each of the two antecedents, a joint probability is computed, this being the product of the three trigram probabilities and the blank probability. That antecedent producing the highest joint probability is selected for use as the substitute value. This additional procedure has been found to be advantageous and yields considerably better results than a mere selection of the trigram that has the highest probability.

From the foregoing it is apparent that the techniques employed rely on contextual constraints which are derived from letter group statistics of the language. While the principles outlined above, and which are described in detail below, are primarily applicable to single letter errors found in English words, similar considerations apply, of course, to other languages and to multiple letter errors found in sequences of letters purported to be words in that language. It will be apparent to those skilled in the art that analyses of multiple letter combinations need not be restricted solely to $n$-grams in which $n$ equals two or three ($n$=2 or 3), i.e., digrams and trigrams, but may also be extended to include other, larger, letter combinations.

The invention will be fully apprehended from the following detailed description of illustrative embodiments thereof taken in connection with the appended drawings, in which.

Figure 4B:
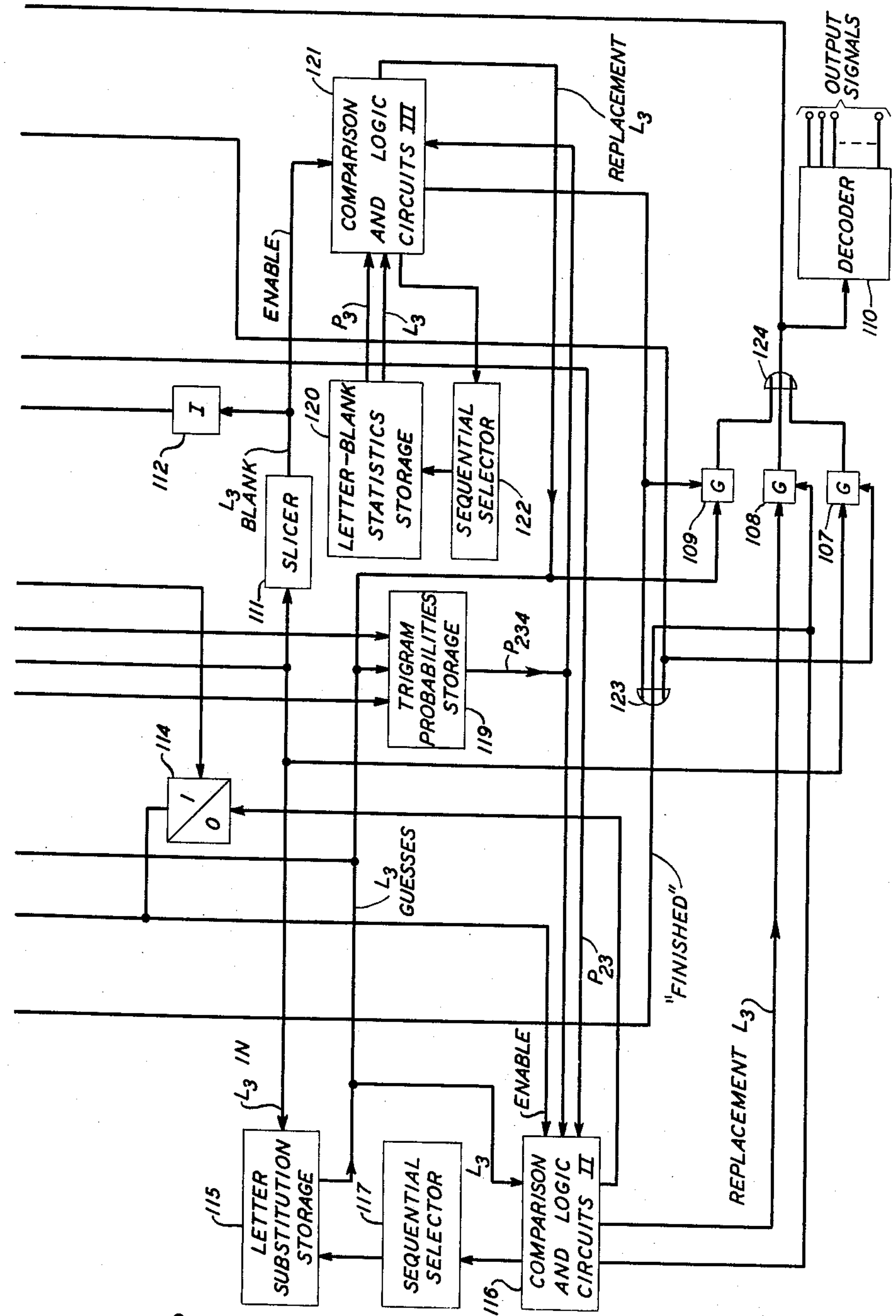
Figure 5:
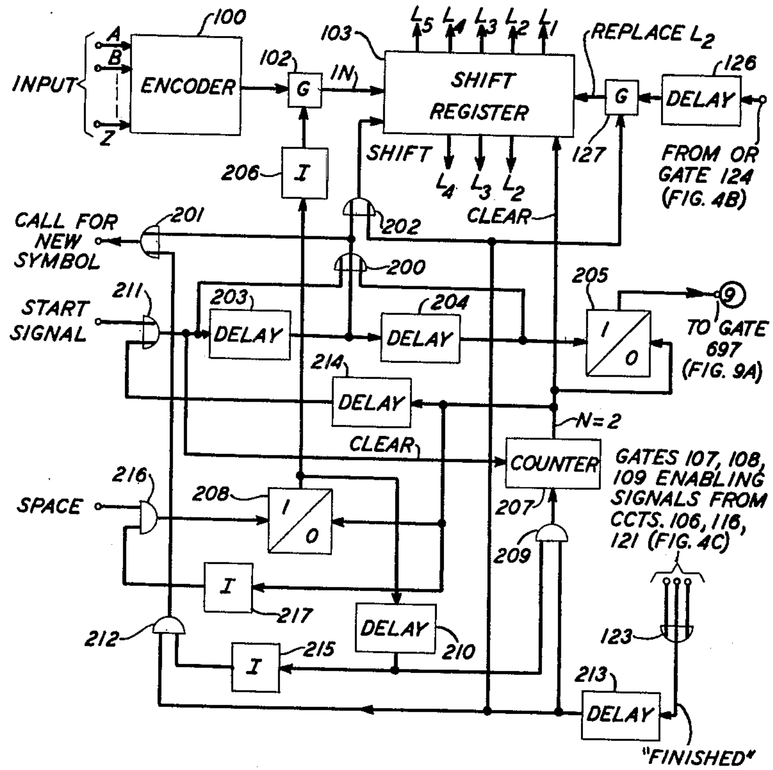
Figure 8:
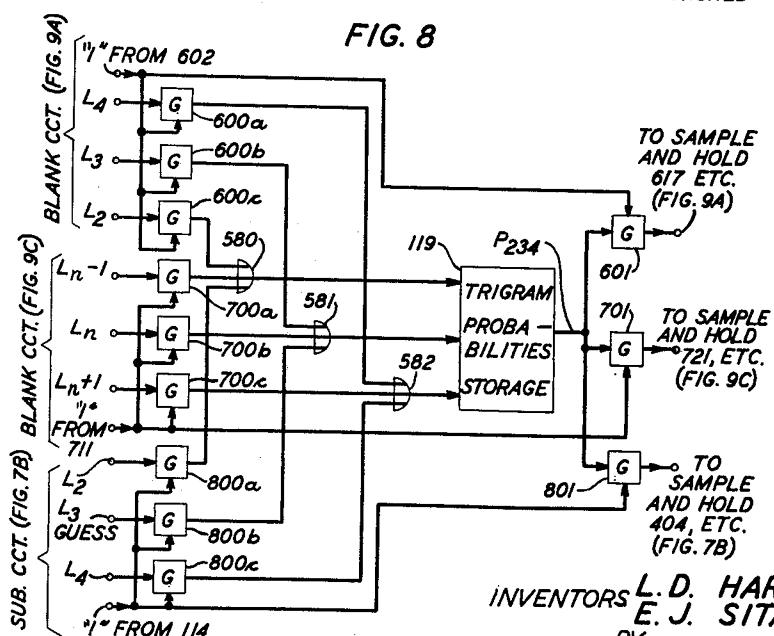
Figure 6:
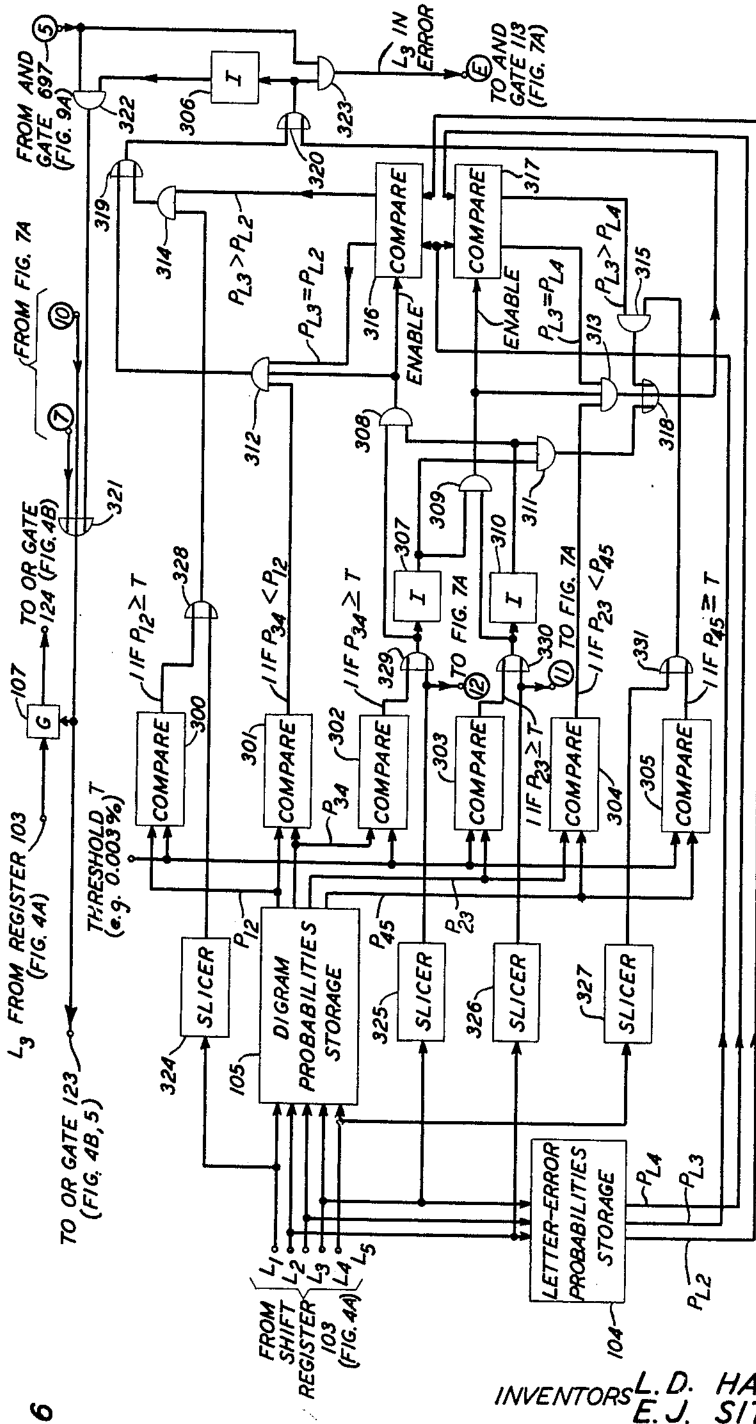
Figures 7A, 7C:
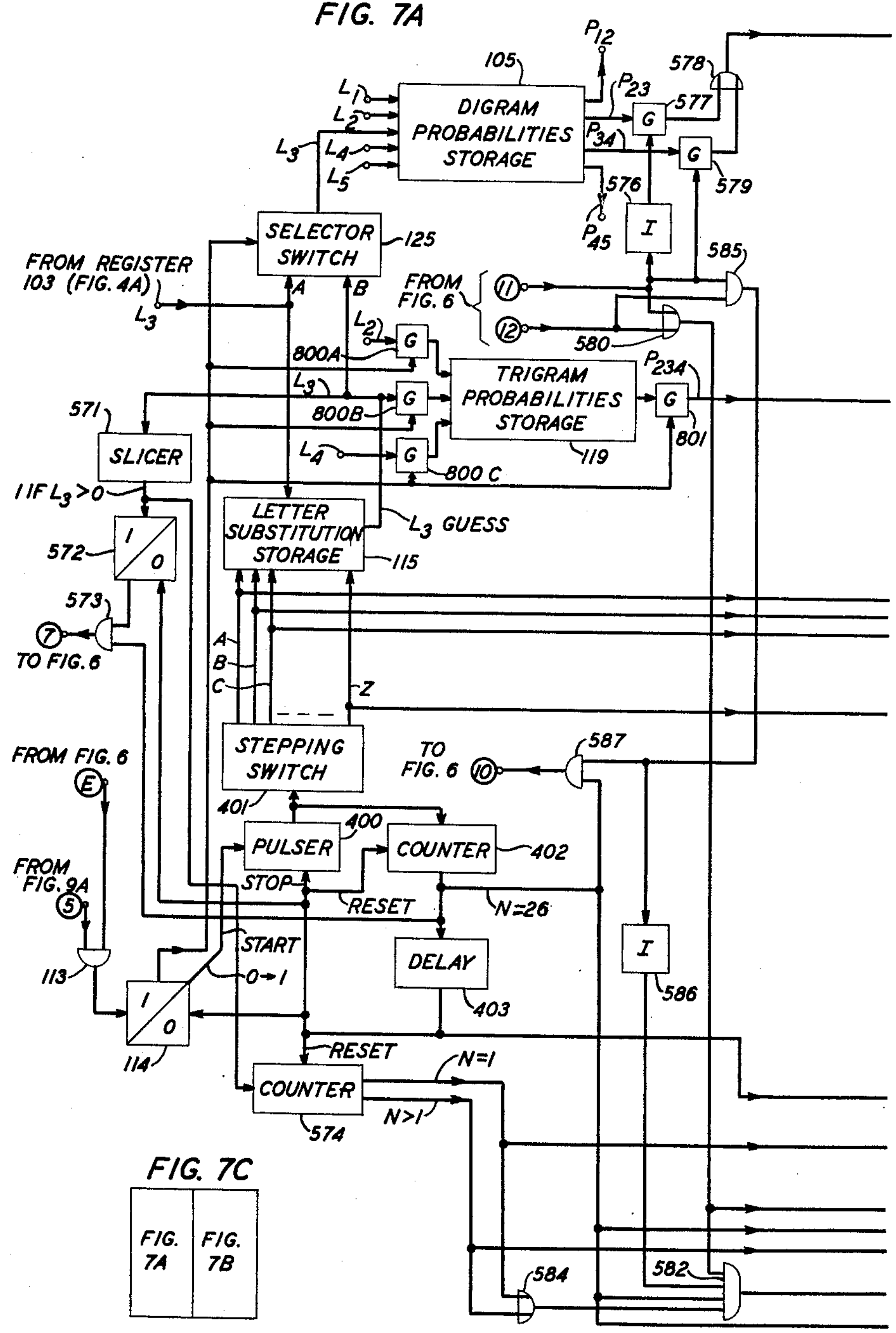
Figure 9A:
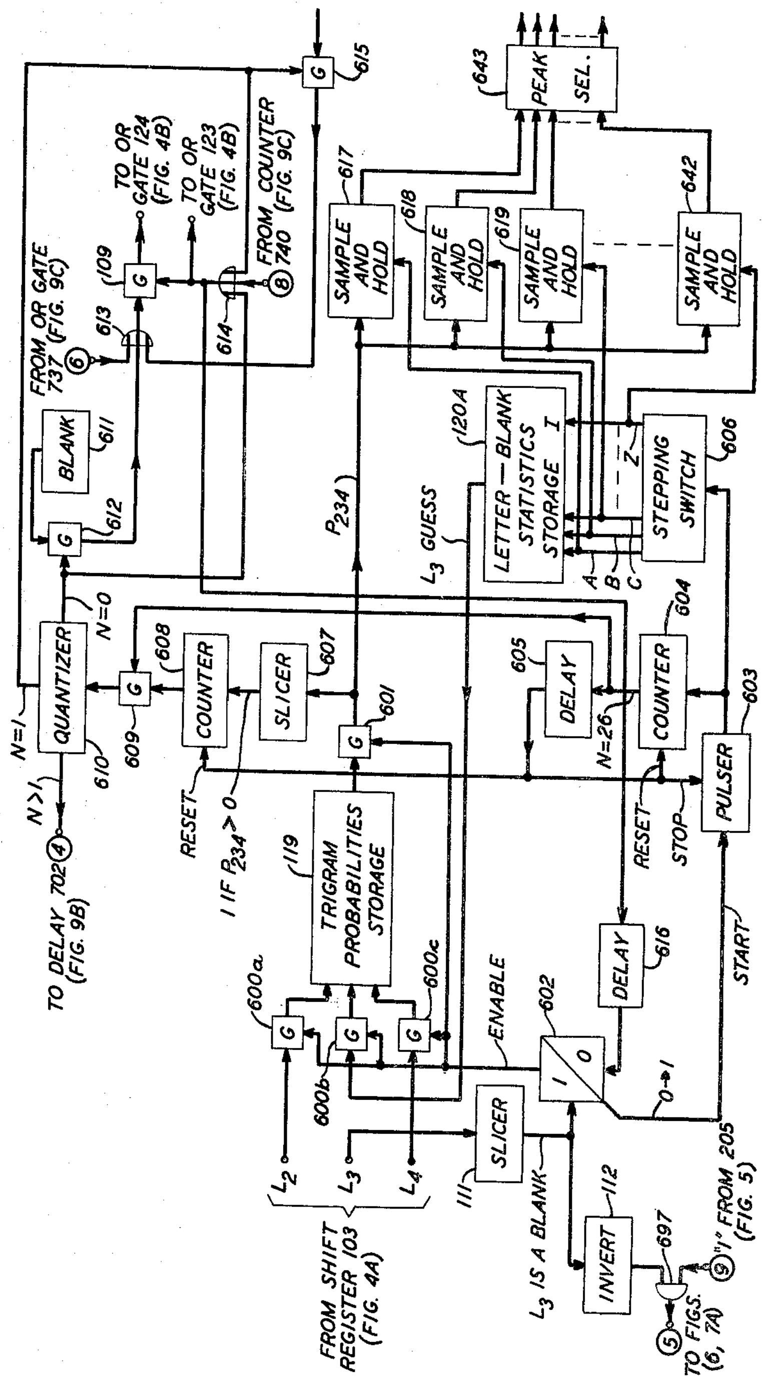

FIGS. 4A and 4B, assembled in the fashion shown in FIG. 4C, together form a block schematic diagram of a system, in accordance with the present invention, for detecting, locating, and correcting single-letter errors in strings of letters purported to be English words;

FIG. 5 is a block schematic diagram of the input control apparatus 101 and associated circuitry which forms a part of the system of FIG. 4;

FIG. 6 is a block schematic diagram of apparatus for detecting and locating substitution errors;

FIGS. 7A and 7B, assembled in the fashion shown in FIG. 7C, together form a block schematic diagram of apparatus in accordance with the invention for correcting substitution errors;

FIG. 8 is a block schematic diagram of apparatus connected in a fashion to illustrate the use of trigram storage for various steps of operation of the apparatus of FIG. 4; and FIGS. 9A, B, C, assembled in the fashion shown in FIG. 9D, is a block schematic diagram which illustrates apparatus for correcting blank errors in sequences of letters purported to be English words.

In the interests of simplicity, the circuit diagrams to be discussed are presented in block schematic form with single line paths to direct the flow of information to the several apparatus components which process it. It is to be understood that in practice each single line information path represents either two electric conductors for conveying logic operation information, or a plurality of electric conductors, e.g., five, for conveying in parallel the several pulses of a binary number which may be used to represent an alphabetic symbol.

GENERAL DESCRIPTION

Figure 1:
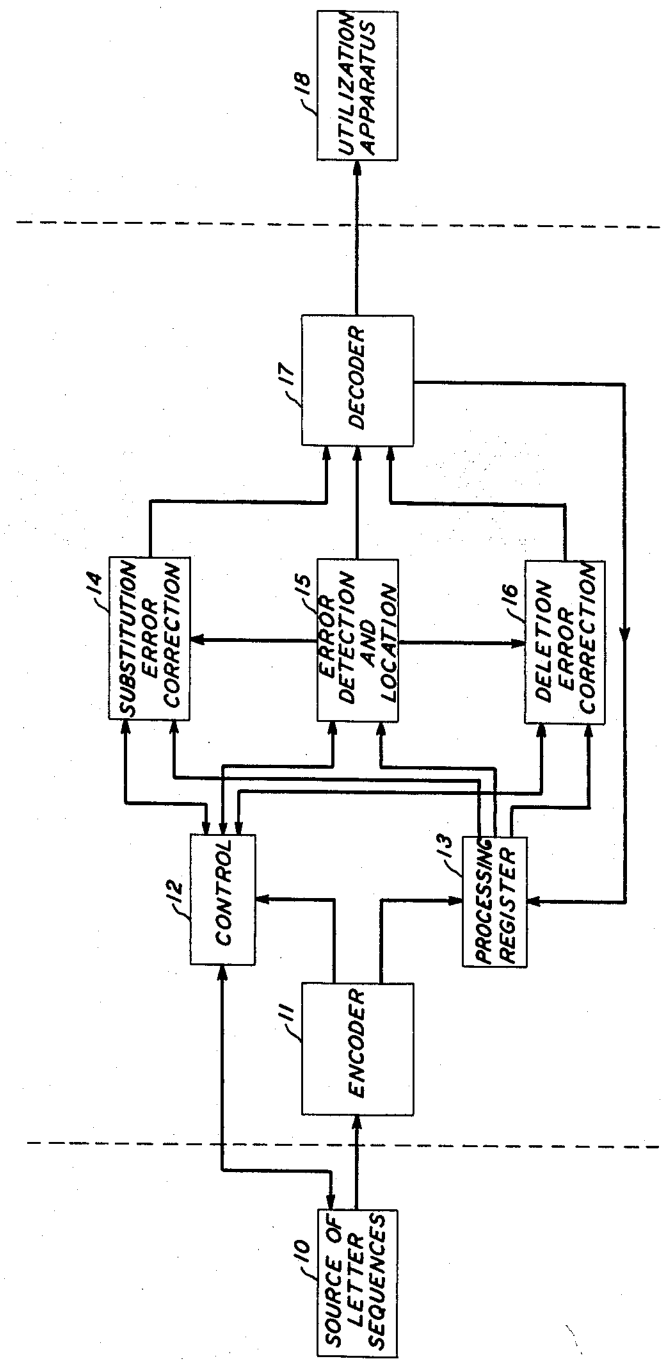
FIG. 1 is a functional block diagram illustrating the general organization and arrangement of the various elements of the invention.

FIG. 1 illustrates, by way of introduction, a functional block diagram of the general organization and arrangement of the various elements of the present invention.

Electrical indications of sequences of letters in formations purported to be English words are supplied by apparatus 10, which itself forms no part of the present invention, to binary conversion apparatus 11. Typically, the letter representations are derived from automatic character recognition apparatus such as, for example, that described in an application of L. D. Harmon, Serial No. 33,015, filed May 31, 1960, now Patent 3,111,646, granted November 19, 1963. Alternatively, the letter representations may be derived from teletypewriter apparatus at a receiving terminal or, in general, from a transmission path interconnecting the apparatus of FIG. 1 to a distant station. In the former case, that is, when the apparatus of FIG. 1 is used in conjunction with character-recognition apparatus, sequences of letters may contain contextual errors due either to the substitution of one letter for another as a result of the failure of the apparatus to respond to poorly formed characters, or blank intervals in the place of letters indicating that insufficient data was available for the machine to make a component decision. In the latter case, that is, for teletypewriter service or transmission of letter indications from a distant station, circuit impairment, noise, or decoding errors may be responsible for either of the two forms of errors.

Encoder 11 transforms the letter indications which normally appear on individual conductors connected to encoder 11, to a code form, preferably a five-digit binary code. Such a code is sufficient for unambiguously defining thirty-two individual characters. Typically, twenty-six alphabet letters, a blank symbol, and a space symbol only are used, and numerals are spelled out.

Five-digit code groups are supplied from conversion apparatus 11 both to control apparatus 12 and to processing register 13. Control apparatus 12 in turn regulates the transfer of information to the various circuit elements, responds to start and space signals from the source 10, and regulates source 10 by calling for additional letter indications as required. Processing register 13 stores sequences of digital representations and supplies them, as required, to the detection and correction apparatus. Single letter errors in groups of letters are detected and located in apparatus 15, and, depending upon the nature of the error, i.e., substitution or deletion, actuates substitution-error-correction apparatus 14 or deletion-error-correction apparatus 16. Simultaneously, control apparatus 12 actuates the appropriate correction circuit, and register 13 supplies to it the necessary data for the required correction operation. As a result, each binary sequence of digits representative of a single letter in the word, or a corrected binary sequence of digits representative of the letter, are supplied to conversion apparatus 17 wherein the digital representation is transformed into a signal which is supplied to utilization apparatus 18. Normally, apparatus 18 is the output circuit associated with source 10 but it may, of course, be of any desired sort. The corrected symbol is also conveyed to processing register 13, where it is used to replace the errant symbol so that it may be utilized in subsequent processing to insure maximum accuracy. By the interposition of the apparatus of FIG. 1 apparatus 18 is thus supplied with sequences of letters in word combinations with substantially higher freedom from errors than otherwise would obtain with a direct connection.

*1. Substitution-error detection and location*

Figures 2A, 2B, 3:
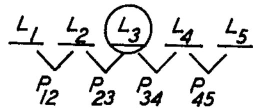
FIG. 2A is a pictorial representation of five letter symbols, $L_{1-5}$, in a meaningful arrangement together with the digram probability symbols associated therewith.
FIG. 2B is a truth table illustrating the manner by which errors in letter $L_3$ of the arrangement of FIG. 2A are detected.
FIG. 3 is a confusion matrix indicating the operating deficiencies of the input source of contextual letters.

FIG. 2A illustrates a sequence of five symbols $L_1$, $L_2$, $L_3$, $L_4$, $L_5$ in a meaningful arrangement, e.g., a word in the English language. It is in accordance with the invention to examine each of the letters, one at a time, to ascertain whether it is correct or in error. Preferably, five position storage apparatus is employed so that all five letter specifications may be made simultaneously available for examination. The letter momentarily occupying the $L_3$ position is the one under scrutiny. Obviously, the string of five symbols need not contain five letters; for example, if the word "the" is represented, te string could be S,S,*t,h,e,* where S denotes a space, i.e., the absence of a letter. If letters of the word "correction" are examined, evidently the string could momentarily be *o,r,r,e,c,* in which case the second *r* is the letter being examined. Thus, the occupancy of the five symbol spaces at any instant is a function of the momentary position of the sequence of transmitted letters as they are stepped through the five letter positions.

Four joint probabilities based on the natural language frequencies of occurrence for the four digrams $L_1L_2$, $L_2L_3$, $L_3L_4$, and $L_4L_5$, are designated respectively $P_{12}$, $P_{23}$, $P_{34}$, and $P_{45}$. From data derived from large statistical samples of digrams, i.e., of letter pairs most often found in the English language, a probability for each has been obtained. These probabilities are compared to a threshold value T in implementing the apparatus of the invention. The threshold of digram probability T may typically be 0.00003, which means that a given digram which lies below this threshold has a likelihood of less than 3 in 100,000 of occurring naturally in the English language.

In accordance with the invention, other probabilities are considered which indicate the likelihood of a given letter's being in error. For example, the expectancy that the second letter $L_2$ is in error is defined as $P_{L2}$. For a system in which random errors are expected, all letters are assumed to be equally likely in error. However, in any system such as a pattern recognizer and, in particular, a script recognition system of the sort described in the above-mentioned Harmon application which generates decision errors occasionally as a result of the writing habits of individual operators, the fact that errors are nonrandom can be used to advantage. Thus, the probability of error for any particular letter, $P_{L2}$ given $L_2$, is employed to weigh the decision as to whether the letter under examination is in error or not.

The procedures for detecting and locating an error, accomplished for the most part in apparatus 15 in the functional diagram of FIG. 1, is tabulated in the truth table of FIG. 2B and is carried out as follows:

(1) Each of the four digrams $L_1L_2$, $L_2L_3$, $L_3L_4$, and $L_4L_5$ is checked against a stored table of digram probabilities, and the corresponding probabilities $P_{12}$, $P_{23}$, $P_{34}$, and $P_{45}$ are compared to the threshold T.

(2) If both digrams $P_{23}$ and $P_{34}$, formed by the letter under question, $L_3$, have a threshold-or-higher likelihood of occurrence ($P_{23} \geqq T$ and $P_{34} \geqq T$), the letter $L_3$ is said to be correct. This condition is illustrated in the first column (Correct) of FIG. 2B.

(3) If both digram probabilities lie below threshold T ($P_{23} < T$ and $P_{34} < T$), the letter common to both digrams, i.e., $L_3$, is said to be in error. This is illustrated in "Error" column 1 of the truth table of FIG. 2B.

(4) If only one of the two digram probabilities lies below threshold T ($P_{23} < T$ or $P_{34} < T$), then an ambiguity is said to exist. For example, if $P_{34} < T$, then either $L_3$ or $L_4$ or both may be in error. Consequently, additional decisions are made to locate the error. These decisions are based on a stored list of likelihood-of-error statistics for a letter suspected to be in error ($P_{L2}$, et cetera).

(a) For the case in which $P_{23} < T$ and $P_{34} \geqq T$, an error either in $L_2$ or $L_3$ is indicated. This is true on one additional condition, namely, that $P_{12} \geqq T$, since if $P_{12} < T$ then $L_2$ is known to be in error from the rule of "two adjacent below threshold digrams," described in 3 above.

If $P_{L3} > P_{L2}$ then $L_3$ is judged to be in error. This case is shown in column 2 of the table.

(b) The complementary case of $P_{34} < T$ and $P_{23} \geqq T$, $P_{45} \geqq T$ and $P_{L3} > P_{L4}$ is shown in column 3 of the table.

(5) In rare cases the probability of error is the same for each of the two letters in a suspect digram. In this case the probabilities of occurrence of each of the two additional digrams, formed by each letter of the suspect digram, are consulted individually.

(a) Thus, if $L_2L_3$ is the suspect digram ($P_{23} < T$ and $P_{34} \geqq T$), and $P_{L2} = P_{L3}$ then the probabilities $P_{12}$ and $P_{34}$ are additionally considered. If $P_{34} < P_{12}$, $L_3$ is said to be in error as indicated in column 4 of the truth table.

(b) Similarly the symmetrical case for $P_{23} \geqq T$ and $P_{34} < T$ and $P_{L3} = P_{L4}$ is given in column 5.

These rules provide sufficient criteria for detecting and locating substitution errors and, as implemented in the invention, permit fully automatic operations to be performed. Since deletion errors are readily sensed by the apparatus, their detection and location are essentially automatic. Once all errors are located, information is supplied to the correction apparatus (blocks 14 and 16 in the apparatus of FIG. 1).

*2. Substitution-error correction*

The replacement of a letter said to be in error depends on additional statistical constraints. If the expectation of error is equi-probable for all letters (random errors), substitution of a "correct" letter may easily be made by selecting that replacement letter which yields the highest probability digrams or trigrams, for example, when inserted into the letter string. However, in a recognition system wherein nonrandom errors are produced, more accurate substitution-error correction is obtained by taking cognizance of the error record of the recognition apparatus.

The procedure followed in the present invention is based on a "confusion matrix," one form of which is illustrated by way of example in FIG. 3. The confusion matrix is derived from the prior performance of the source apparatus, for example, character recognition apparatus which is employed to convert handwritten, hand printed, or machine printed material into electrical form. From the table it will be observed that errors made by such apparatus are highly restricted. For example, if the machine produces an *h* as its decision for an input character, the only possible antecedents from the past history of performance of the machine are *b, h, k,* or *l.* The use of the confusion matrix, and the error correction procedures, are as follows:

(1) The letter said to be in error is looked up in the decision column of the confusion matrix. If there is no noted entry except itself (the only entry lies on the diagonal), the letter is apparently not in error; the error detection and location procedure has given a false alarm. No penalty need be taken for this, the letter in question is simply left intact.

(2) If the confusion matrix reveals only one antecedent other than identity, i.e., there is a single other letter which could have been identified as the letter in question, that antecedent letter is said to be the correct one and it is substituted for the decision letter in question.

(3) If the confusion matrix reveals more than one antecedent for example, *n* other than letters then (a) All *n* possibilities are substituted for $L_3$ and the *n* trigrams ($L_2L_3L_4$) are considered.

(b) If all *n* trigrams lie below a threshold (for example, all are equal to or less than 0.002 percent), only the *n* digrams $L_2L_3$ and their probabilities $P_{23}$ are considered. The antecedent of $L_3$ which yields the highest probability $P_{23}$ is said to be the correct substitution choice.

(c) If only one of the *n* trigrams has a probability $P_{234} > T$, the corresponding $L_3$ is the correct one.

(d) If two or more of the *n* trigrams have probabilities $P_{234} > T$ the $L_3$ yielding the highest probability $P_{234}$ is said to be the correct one.

*3. Deletion-error correction*

For deletion errors, that is, a blank space in a letter string, the only problem is to find the most likely letter to be inserted. One method for selection is based on the simple $n$-gram probability statistics where each of the twenty-six possibilities is used in turn. With this procedure the $n$-gram with the highest probability indicates the correct letter. The procedures of the present invention, to be described below by way of illustration, are somewhat more complex in that they take advantage of the nonrandom nature of letter deletions occurring in a particular system.

(1) A trigram $L_2-L_4$ (or $S-L_4$ or $L_2-S$) is formed and all possible antecedent letters from the confusion matrix are substituted for the blank, one at a time.

(a) If all trigrams have zero probability, the blank is left intact.

(b) If only one trigram has a probability $P_{234}>0$ correction is accomplished by substituting that antecedent letter for the blank.

(c) If two or more trigrams have likelihoods greater than zero, the two highest valued ones are selected and then additional logical operations are performed to choose between them. This is accomplished by constructing three trigrams for each of the two possible choices. Thus, for each of the two $L_3$ candidates, trigrams $L_1L_2L_3$, $L_2L_3L_4$, and $L_3L_4L_5$ are formed. Next for each of the two possible substitute letters, the product $$P_{123}\times P_{234}\times P_{345}\times P_3$$

(where $P_3$ is the confusion matrix probability that given a blank $L_3$ is the antecedent) is obtained. The higher product of the two determines the correct antecedent substitution for the blank.

DETAILED DESCRIPTION

*1. Overall system*

The over-all block diagram of FIG. 4 shows apparatus arranged to implement the procedures outlined above. A sequential string of letter symbols including blanks is presented to encoder 100 via twenty-seven symbol input lines from a source of electrical indications of letters in combination purported to be words, e.g., from a character recognition system. As a given line is energized, the encoder translates this information into a five-bit binary code. For example, as input lead A is energized, the encoder develops five digits 00001, and as input lead B is energized, code symbol 00010 is produced. Preferably a blank is denoted by the symbol 11111.

As each new symbol is called up via input control 101, its binary representation is transferred via gate 102 into a processing register, e.g., a shift register 103. This register has five parallel channels to accommodate the five-bit entry. Since there are five positions in the register, five five-bit letter representations $L_5$, $L_4$, $L_3$, $L_2$, and $L_1$ are accommodated. With this notation the most recent entry is $L_5$. With each new symbol the register contents are shifted one space so that a new entry can be made. As shifting continues, the symbols "spill" off the $L_1$ end of the register and are discarded since all required processing on a given symbol is completed by this time. Processing of this sort continues until a "space" signal is received from the input source 10 signifying the end of a word. Just prior to the receipt of a space signal, the last letter of the word occupies the input end ($L_5$) position in the register. Input control 101 inhibits the calling up of the next word until the last letter of the present word occupies, in turn, positions $L_4$ and $L_3$, and the tests associated with each space, described below, are completed. After the test at $L_3$ the system is ready to accept a new word and the input control begins a new cycle.

The error detection, location, and correction operations of the system occur in repetitive cycles; each letter is treated completely when it occupies position $L_3$ in shift register 103. Consider, for example, that in the apparauts of FIG. 4 a word or a part of a word resides in the register such that $L_5$, $L_4$, $L_3$, $L_2$, and $L_1$ are all occupied. This is the general case; the operations described below are identical for any partial occupancy of the register. All five of the symbol representations in the register are, at any instant, available on parallel output lines. These are designated in the figure as $L_3$, the symbol in question, and the two adjacent symbols on each side, i.e., $L_1$, $L_2$, and $L_4$, $L_5$.

Three of the five lines $L_2$, $L_3$, and $L_4$ communicate directly with letter-error probabilities storage 104. This is a conventional storage system utilizing, for example, magnetic cores or the like. Information contained in permanent memory unit 104 pertains to the previous error performance of the input system which produces the input sequences. For each letter of the alphabet there is stored a corresponding probability of error. Thus $L_3$, representative of one letter in a sequence, is utilized as an address signal, and when supplied to storage apparatus 104, calls up a signal $P_{L3}$, which is a number denoting the likelihood that $L_3$ is in error. Thus, the input signals $L_2$, $L_3$, and $L_4$, in effect, interrogate probabilities storage 104 for the corresponding probability figures.

All five of the symbols in the register are also presented simultaneously to digram probabilities storage 105. The $L_3$ symbol, however, is not presented directly to this memory unit but is gated thereto via selector switch 125 which in turn is controlled by logic circuit 106 via AND gate 113 and flip-flop 114. Digram probabilities storage 105 is a permanent memory unit similar in type to letter-error probabilities storage 104. It contains the digram probabilities, i.e., frequency of occurrence of English language digrams, for each of the twenty-seven possible letter pairs. It therefore includes digrams for the twenty-six alphabet letters and a space. The five inputs to the store are taken in pairs $L_1L_2$, $L_2L_3$, et cetera as addresses; the corresponding outputs evoked from the store are the digram probabilities $P_{12}$, $P_{23}$, $P_{34}$, and $P_{45}$. Both the probabilities from store 105 and those for letter errors derived from store 104 are delivered to comparison and logic circuit 106, which is normally enabled via AND gate 697. On the basis of these two sets of inputs, logic circuit 106 provides a decision as to whether $L_3$ is correct or is in error. This decision follows the rules shown in the truth table of FIG. 2B. Thus, a substitution error for the $L_3$ symbol may be detected.

If $L_3$ is determined to be correct, gate 107 is actuated allowing $L_3$ to pass from register 103 to decoder 110 via OR gate 124. The binary representation of letter $L_3$ is consequently decoded into one of the twenty-six letters and delivered to one of twenty-six output lines A, B . . . Z, for transmission to suitable utilization apparatus, e.g., apparatus 18 in FIG. 1.

If $L_3$ is found to be incorrect, an error signal is transmitted from logic circuit 106 which fully enables AND gate 113. This in turn sets flip-flop 114 to the "1" state enabling comparison and logic circuit 116 and controlling selector switch 125.

Letter-substitution storage 115 holds in storage a portion of the confusion matrix information of FIG. 3. Its input is $L_3$, representative of the letter indicated to be in error. Sequential selector 117 controlled by logic circuit 116 reads out of storage 115, in turn, all of the possible antecedent letters which the confusion matrix indicates are possible for a machine decision of $L_3$. Thus, sequentially evoked new symbols are referred to as "$L_3$ guesses." Because of the nature of the confusion matrix information, one of these guesses must necessarily be the correct letter. If there is only one possible antecedent, correction is completed. If, however, a given $L_3$ may have been a substitute for several different original but correct letters, each of these possibilities is next examined. Consequently, the $L_3$ guesses are sequentially presented to digram probabilities storage 105 via selector switch 125 and to trigram probabilities storage 119. The resultant probabilities $P_{23}$ and $P_{234}$ are examined by logic circuit 116 in accordance with the procedure for substitution-error correction described above and described in detail hereinafter. The most likely $L_3$ guess is selected by logic circuit 116 to be the "replacement $L_3$" and is gated by gate 108 through OR gate 124 to decoder 110 and thence to the relevant output line. Flip-flop 114 is thereupon reset and the system is restored to initial conditions in preparation for the processing of the next symbol.

Errors of deletion are detected and corrected in the following manner. In the event that slicer 111 indicates with a "1" signal that $L_3$ is a blank, AND gate 113 is not enabled and the above-described sequences cannot occur. Instead, comparison and logic circuit 121 is enabled. Simultaneously logic circuit 106 is inhibited by virtue of a "0" signal from inverter 112.

Stone 120 contains representations of numbers which specify those letters possible and their likelihood of occurrence, given a blank, as indicated in the table of FIG. 3. Logic circuit 121 operates sequential selector 122 to read out of store 120 symbols for the "replacement $L_3$" and their probabilities ($P_3$) one at a time. Each replacement $L_3$ is delivered to trigram probabilities storage 119 to form trigram probabilities $P_{234}$. These numbers taken together with the $P_3$ numbers are compared in accordance with the previously described procedure for blank replacement. The highest joint probability reflects the most likely $L_3$ replacement and gate 109 is enabled to allow the decoder 110 to select the appropriate output line.

For any of the final gating operations described above, gate 107 operating for a correct letter, gate 108 operating for a substitution correction, or gate 109 operating for a blank replacement, OR gate 123 is energized. It delivers a signal to input control 101 so that the next symbol in the input string may be called up and operated upon.

After processing each $L_3$ it is required not only that the corrected $L_3$ be transmitted to the output circuit but that it also be supplied to shift register 103 as well to replace the erroneous $L_3$ value. That is, the old $L_3$ is replaced so that subsequent processing of the symbol string can proceed with maximum accuracy. With the delayed "finished" signal from delay 213 (FIG. 5), signifying that processing is complete on the erroneous $L_3$, the contents of register 103 are shifted. Thus the original $L_3$ input symbol is now in the $L_2$ position of the register. Simultaneously, the representation of the corrected $L_3$ derived from OR gate 124 is delivered to gate 127 via delay 126. Consequently, the replacement symbol is gated by gate 127 into the $L_2$ position of the register, the gate having access to that stage of the register and precedence over the old contents of that stage.

*4. Input control apparatus*

Details of input control apparatus 101 are shown in FIG. 5. A single pulse "Start" signal, derived from any convenient source, for example, the input character recognition system, is applied to OR gate 211 and thence to OR gate 200 which in turn energizes OR gate 201 to call for a new symbol from the input source. OR gate 202 is energized simultaneously to shift the contents of register 103 one place to the right. Since gate 102 is normally enabled, the called-up symbol, encoded by encoder 100, is immediately shifted into register 103 to reside in the $L_5$ position. Since this is the only occupied position in the register and since $L_3$ is the preferred position for examination, the first symbol is shifted two more spaces to bring it to the correct position and, at the same time, to supply the register with the next two input symbols. This is accomplished by delay elements 203 and 204 which sequentially apply the Start signal to OR gate 200 and thence to OR gates 201 and 202. The delayed signal from delay 204 also sets flip-flop 205 to the "1" state thus activating terminal 9. This has the effect of partially enabling AND gate 697 (FIGS. 1 and 9) which activates the various logic circuits for processing $L_3$.

Whenever an output operation occurs as a result of processing, either gate 107, 108, or 109 is enabled as described above. Consequently, OR gate 123 transmits a "Finish" signal to the input control circuit. This signal is delayed by delay 213 sufficiently to allow the logic circuits to complete their processing and is then used to call up a new symbol via AND gate 212, whose other input is normally energized, and OR gate 201. Simultaneously the signal from delay 213 acts through OR gate 202 to shift the new symbol into register 103 and to shift the other contents of the register one place. Furthermore, the signal from delay 213 enables gate 127 to insert the corrected symbol obtained from OR gate 124 (FIG. 4) via delay 126 into shift register 103 thereby replacing the old $L_3$ symbol now in the $L_2$ position of the register. This repetitive process continues until a "Space" signal is received signifying the end of a word. No further symbols are thereafter called up or processed until the remaining symbols in register 103 have been processed. The last symbol processed, $L_3$, is now shifted to $L_2$ by the signal from delay 213 which also called up the Space signal. Consequently, the last two symbols of the word now occupy $L_3$ and $L_4$ respectively and must be processed. After that, reigster 103 is cleared so that as new symbols are called up there is no interaction between the last letters of the old word and the first letters of the new word.

The Space signal actuates flip-flop 208 via AND gate 216 whose other input is normally active. The "1" state of the flip-flop acts through inverter 206 to disable gate tively and must be processed. After that, register 103 Also via delay element 210 the active state of flip-flop 208 inhibits the Finish signal from calling up new symbols; this is accomplished via inverter 215 which disables AND gate 212. Furthermore, the signal from delay 210 partially enables AND gate 209. Delay 210 thus prevents the Space signal from inhibiting its own calling up and further prevents the signal from delay 213 that evokes the Space signal from activating counter 207. As the last two symbols of the string are processed the requisite shifting is produced via OR gate 123, delay 213, and OR gate 202. However, each of the last two Finish signals enters a count in counter 207. With the final signal from delay 213 signifying that processing is complete on the last letter in the word a shift signal is sent to register 103 as usual. This is of no consequence at this time since the count of two in counter 207 is sufficient to clear register 103. The full count also sets flip-flop 208 to the "0" state. Inverter 217 is employed to over-ride the still present space signal at the flip-flop and insure that the "0" state is established. Delay 210 acts to re-enable AND gate 212 and to disable AND gate 209 for the resumption of signal processing. The same condition is now present as at the beginning of the entire process, that is, a suitable Start signal is required for further processing. This is provided by utilizing the delayed signal from counter 207 to act via delay 214 and OR gate 211 as a synthetic Start signal. The full cycle for processing a word is now completed and a new one has been initiated.

*5. Apparatus for detection of substitution errors*

Apparatus in accordance with the present invention for detecting substitution errors is shown in FIG. 6. Each of the five-bit symbol representations of the contents of shift register 103 is connected to the input of digram probabilities storage 105. These signals utilized two at a time as addresses by the store, evoke the probabilities associated with each pair of letters. This operation is similar to that of conventional magnetic core storage readout, for example, in which a matrix is addressed both by an X and a Y signal and the readout takes place for the stored quantity at the intersection of the X row and the Y column. Thus, in the digram storage used in the present invention, $L_1$ specifies a row and $L_2$ a column in the matrix; the information read out of the intersection is the stored quantity $P_{12}$. For simplicity, $L_3$ is shown in FIG. 6 connected directly to the input of store 105. The exact method of connection is indicated in FIG. 4 and detailed in FIG. 7. In the operation of the circuit of FIG. 6, an enabling signal is obtained from AND gate 697 via terminal 5. Consequently, AND gates 322 and 323 are partially enabled so that they way be actuated by the signals derived by other elements of the circuit of FIG. 6.

The four probabilities $P_{12}$, $P_{23}$, $P_{34}$, and $P_{45}$ are available at the output of store 105, and similarly the three probabilities $P_{L2}$, $P_{L3}$, and $P_{L4}$ are available at the output of letter-error probabilities storage 104. The additional quantity required, that is, the threshold T, is provided as a permanently stored binary number. Preferably it is proportioned to represent a probability of 0.003 percent and is made available to a number of comparator circuits. The operations described below satisfy the criteria shown in FIG. 2B. There are six outcomes as follows:

(1) If $P_{34}$ is smaller than threshold T, compare circuit 302 emits a "0" signal (via OR gate 329) which is inverted by inverter 307 to a "1" and applied to AND gate 311. Similarly, if $P_{23}$ lies below threshold T, inverter 310 provides the other enabling condition for AND gate 311. The signal thus emitted passes through OR gates 318 and 320 and AND gate 323 to terminal E signifying an error in $L_3$.

(2) If $P_{23}$ lies below threshold and $P_{34}$ is equal to or is above threshold, inverter 310 acts to enable AND gate 308. This signifies that either $L_2$ or $L_3$ is in error. The signal out of AND gate 308 enables compare circuit 316 to compare $P_{L2}$ with $P_{L3}$, derived by letter-error probabilities storage 104. If $P_{L3}>P_{L2}$ AND gate 314 is partially enabled. If compare circuit 300 emits a "1" signal signifying that $P_{12}\geqq T$ both conditions for activation of AND gate 314 are satisfied and an $L_3$ error signal is transmitted to terminal E via OR gates 319 and 320 and AND gate 323.

(3) If $P_{34}$ lies below threshold T and $P_{23}$ is equal to or is greater than T, inverter 307 acts to enable AND gate 309. This signifies that either $L_3$ or $L_4$ is in error. The signal output of AND gate 309 enables comparator 317 to compare $P_{L3}$ with $P_{L4}$. If $P_{L3}>P_{L4}$, AND gate 315 is partially enabled. If comparator 305 emits a "1" signal (via OR gate 331) signifying that $P_{45}\geqq T$ both conditions for activation of AND gate 315 are satisfied and an $L_3$ error signal is transmitted to terminal E via OR gates 318 and 320 and AND gate 323.

(4) If $P_{23}$ lies below threshold T and $P_{34}$ is equal to or greater than T, AND gate 308 is enabled as is comparator 316. If compare circuit 316 activates its output line signifying that $P_{L3}=P_{L2}$ then the two conditions for AND gate 312 are satisfied. If, in addition, comparator 301 signals that $P_{34}<P_{12}$ AND gate 312 is fully enabled and an $L_3$ error signal is transmitted to terminal E via OR gates 319 and 320 and AND gate 323.

(5) If $P_{23}$ is equal to or is above threshold T and $P_{34}$ is less than T, AND gate 309 is enabled as is comparator 317. If comparator circuit 317 activates its output line, which signifies that $P_{L3}=P_{L4}$, and if comparator 304 indicates that $P_{23}<P_{45}$, AND gate 313 is fully enabled. Consequently, an $L_3$ error signal is transmitted to terminal E via OR gates 318 and 320 and AND gate 323.

(6) If none of the above tests, 1 through 5, indicates that $L_3$ is in error, then $L_3$ is presumed to be correct. Consequently, with OR gate 320 inactive, inverter 306 transmits a signal to OR gate 321 via AND gate 322. This in turn enables gate 107 to pass the given $L_3$ directly to the output circuit via OR gate 124 (FIG. 4) and to signal the end of processing via OR gate 123 (FIGS. 4 and 5).

Each of the substitution-error detection procedures, which cover each of the five different possibilities outlined in table of FIG. 2B, are unique so that one and only one error indication is given via AND gate 323 terminating in an error signal on terminal E of FIG. 6. This signal is utilized to energize apparatus which corrects the indicated error in $L_3$.

In the above-described procedures it is assumed that none of the five symbols in register 103 is a blank. However, if either $L_1$, $L_2$, $L_4$, or $L_5$ is a blank, then the operations must be modified. The tests involving $n$-gram probabilities are based on the presence of letter symbols in appropriate positions; the inclusion of a blank would make such tests meaningless since the digrams which include the blank would have zero probabilities. Store 105 would transmit these meaningless signals to comparators 300 through 305, thus not allowing them to yield results meaningful to the $L_3$ under consideration.

To obviate this difficulty, above-threshold probabilities are assigned to those digrams which include a blank. This is accomplished by slicers 324, 326, 325, and 327 which emit a "1" signal for the presence of a blank in $L_1$, $L_2$, $L_4$, $L_5$ respectively. If a particular slicer (324, 325, 326, or 327) so indicates a blank, its output signal replaces the otherwise operative comparator outputs (300, 302, 303, or 305) via OR gates 328, 329, 330, or 331. Such action permits the tests on $L_3$ to be made with maximum accuracy consistent with minimum interference from a blank in the symbol string.

*6. Apparatus for correcting substitution errors*

FIG. 7 (formed by placing FIGS. 7*a* and 7*b* together in the manner indicated in FIG. 7*c*) shows in detail apparatus in accordance with the invention for correcting substitution errors. It is, in essence, a detailed drawing of the comparison and logic circuit 116 of FIG. 4. The "1" error signal of terminal E which indicates the presence of an error in $L_3$ is combined with an enabling "1" signal supplied to terminal 5 from AND gate 697 in order to activate AND gate 113. Terminal 5 is ordinarily in the active or "1" state unless a blank is present; this operation is described subsequently in connection with a description of the apparatus of FIG. 9 directed to blank correction. The activation of AND gate 113 sets flip-flop 114 to the "1" state. The transient change of state of the flip-flop in turn starts pulser 400. Additionally, the active state of the flip-flop controls selector switch 125 so that input line A, carrying the $L_3$ input signal, which is normally connected to the output of the switch is now disconnected. Line B instead is connected so that the $L_3$ guesses made by the system will provide the input source to digram probabilities storage 105. Pulser 400 in operation steps stepping switch 401 along and simultaneously advances counter 402. Stepping switch 401 advances sequentially to energize in turn each of the twenty-six addresses of store 115, representing A through Z. Since the input to store 115 is the momentary $L_3$ obtained from shift register 103 the output of store 115 is, in turn, each of the possible substitution letters which are indicated by the confusion matrix of FIG. 3 to be possible alternative values of $L_3$.

The $L_3$ guesses are transmitted to digram probabilities storage 105 via selector switch 125, and to trigram probabilities storage 119. The output of store 119 is the probability for each trigram $P_{234}$ formed by an $L_3$ guess and the two neighboring given input symbols $L_2$ and $L_4$. As each probability $P_{234}$ is formed, it is sampled and held in sample-and-hold circuits 404 through 429. Each of these circuits is properly energized in turn via the addressing signals derived from stepping switch 401.

A similar action occurs simultaneously for the digrams formed by the $L_3$ guesses. In this case the $L_3$ guess supplied by store 115 is transmitted via selector switch 125 to the $L_3$ input of store 105 and results in the emission of digram probabilities $P_{23}$ from the store. These probabilities are sampled and held in sample-and-hold circuits 431 through 456. A further consequence of the $P_{234}$ trigram probabilities evoked from store 119 is that slicer 570 emits a "1" signal each time that $P_{234}$ lies above a pre-assigned threshold $t$, in this case 0.002 percent, a value which has been found entirely satisfactory in the practice. If during the entire scanning of the twenty-six stepping switch positions at least one $P_{234}$ lies above threshold $t$, slicer 570 actuates flip-flop 569.

At the end of the sweep through store 115 the Z position is reached and counter 402 registers a total count of twenty-six. This count plus the "1" condition of flip-flop 569 activates AND gate 567 via OR gate 575. This in turn enables gate 564. Meanwhile peak selector 430 examines in parallel the contents of all sample and hold circuits 404 through 429 and energizes that one of its twenty-six output lines that represents the largest value $P_{234}$. Apparatus for selecting the largest signal from among a variety of them is well known in the art. Thus, one of the corresponding gates 537 through 562 is enabled. Symbol storage positions 511 through 536 each contain a permanently stored five-bit number representing one of the twenty-six alphabetic letters. Upon enabling of one of the gates 537 through 562, the corresponding letter representation is passed through OR gate 563 to the now enabled gate 564. The letter representation is transmitted from this point through OR gate 566 to gate 108 which is now also enabled due to the full count in counter 402. Gate 108 therefore delivers the corrected symbol representative of $L_3$ to the output system via OR gate 124 and decoder 110 in FIG. 4.

It should be observed that for the operation just described, peak selector 430 responds if one or more of the trigram probabilities exceeds zero. This serves both the case where there is only one antecedent which is not the given $L_3$ and the case wherein the most likely one of several antecedents must be chosen. The five different possible outcomes are as follows:

(1) If there is no antecedent except the given $L_3$ itself, store 115 preferably yields no output as it is scanned. For simplicity in the practice of the invention the confusion matrix diagonal of FIG. 3 is not stored. In this event, slicer 571 yields a "0" output and flip-flop 572 remains in its "0" state. If this condition persists throughout the full operation of stepping switch 401 a full count in counter 402 is sufficient to enable AND gate 573 to transmit a signal via terminal 7 to OR gate 321 in the apparatus of FIG. 6. Thus the given input $L_3$ is transmitted intact to the output system.

(2) If store 115 reveals one and only one possible antecedent, that singular choice is transmitted to the output system. Counter 574 registers the number of antecedents by counting the number of times that slicer 571 senses an $L_3$ output from store 115. If the counter 574 registers a count of exactly one, OR gate 575 transmits this information to AND gate 567. Consequently, at the end of the full scan the count of twenty-six from counter 402 provides the other enabling condition via AND gate 567 and the appropriate $L_3$ substitute value is transmitted to the output circuit as described above.

(3) If more than one antecedent exists but all associated trigram probabilities lie below threshold $t$, flip-flop 569 is in the "0" state and the $N>1$ output of counter 574 is active. Thus at the end of the full scan all three conditions for enabling AND gate 568 are present. This enables gate 565. The information developed by sample-and-hold circuits 431 through 456, peak selector 457, letter-symbol sources 458 through 483, gates 484 through 509, and OR gate 510 is thereupon passed through gate 565. This part of the system works identically to that described above for peak selection of trigram probabilities. In this case the most likely digram is selected and the information gated through gate 565 is the letter representation associated with that highest digram likelihood. This is passed through OR gate 566 to the output system as previously described.

(4) If more than one antecedent exists and only one of the associated trigrams is equal to or greater than threshold, flip-flop 569 is set to the "1" state. At the end of the scan cycle AND gate 567 is activated to enable the system to utilize the information developed by peak selector 430 which is, of course, the selection of the required symbol.

(5) If more than one antecedent reveals a probability $P_{234}$ greater than or equal to threshold $t$, the same action occurs as in the preceding case. Since peak selector 430 energizes only one of these output lines, that $L_3$ yielding the highest probability $P_{234}$ is selected for transmission to the output circuit.

If either or both of the given input symbols ($L_2$, $L_4$) are blanks, the above-described procedure must be modified. As with the error-detection procedures, provision must be made for handling blanks when making $n$-gram probability tests. In the presence of blanks, trigram probabilities storage 119 will transmit meaningless (zero) information to sample-and-hold circuits 404 through 429. Proper selection of the correct symbol representation of $L_3$ thus could not be made.

In accordance with the present invention this situation is accommodated by employing digram evaluations only; by bypassing the trigram tests completely. Of course, trigrams only, or both digrams and trigrams in combination could easily be employed if desired. The technique employed uses just one of the two possible digrams, that one not including a blank. For example, if only $L_2$ is a blank, the digrams $(-L_3)$ formed for all antecedents have zero probabilities. Therefore, the digram probabilities produced by the antecedents and the letter following it, i.e., $L_4$, are used. Conversely, if $L_4$ is a blank, the digram probabilities derived from $L_2L_3$ are employed. If both $L_2$ and $L_4$ are blanks, no useful information is obtained from any tests; the intact $L_3$ is therefore transmitted directly to the output.

The details of these operations are as follows:

(a) If $L_2$ is a blank, slicer 326 (FIG. 6) emits a "1" signal which, via terminal 11, OR gate 580 (FIG. 7), inverter 581, and AND gate 567, inhibits gate 564. This action does not allow any information (which would be meaningless) obtained from store 119 to be utilized. Simultaneously, the signal on terminal 11 acts through inverter 576 to disable gate 577 thus not allowing the probabilities $P_{23}$ (which also would be meaningless) to pass into the sample-and-hold circuits 431 to 456. This signal also enables gate 579 which transmits the probabilities $P_{34}$, i.e., the probabilities of the digrams formed by the antecedents and the letter following it, to the sample-and-hold circuits 431 to 456. The action that now follows is identical to that described above for peak selection. At the end of the scan, all four conditions for enabling AND gate 582 are present. The enabling of this gate allows the selected symbol to pass into the output via gate 565 which receives its enabling signal via OR gate 583.

(b) If $L_4$ is a blank, similar procedures to those of (a) above are used. In this case, $P_{23}$ is used and $P_{34}$ is suppressed inasmuch as terminal 11 is inactive since slicer 326 (FIG. 6) has a "0" response at this time. All other operations are essentially those normally employed when all trigrams have below-threshold values (step 3 above). The only difference is that gate 565 is enabled (via OR gate 583) by AND gate 582. Peak selection of digram probabilities occurs as previously described. The letter representation associated with the highest digram likelihood is passed through gate 565 into the output system.

(c) If $L_2$ and $L_4$ are both blanks, no meaningful $n$-gram tests can be made, therefore the intact $L_3$ notation is passed into the output system. This is accomplished as follows: AND gate 585 is enabled by the "1" signals from slicers 325 and 326 (via terminals 11 and 12) and disables AND gate 582 via inverter 586. This does not allow any information to pass into the output via gate 565. At the end of the scan, the ($n=26$) signal from counter 402 combines with the enabled signal from AND gate 585 to enable AND gate 587. Consequently, terminal 10 is energized and OR gate 321 (FIG. 6) is activated to pass the intact $L_3$ symbol into the output system.

*Memory storage apparatus*

Throughout the entire system, several of the memory storage units have multiple uses. For example, the trigram probabilities storage apparatus is called upon for use by three different circuits. To avoid costly duplication of these stores it is in accordance with the present invention to employ selective gating arrangements as illustrated in FIG. 8. Trigram store 119 has three possible sets of inputs which may arrive via OR gates 580, 581, and 582 from any one of three gates, 600, 700, or 800. Similarly, the probability $P_{234}$ output of the store may be selectively gated out to one of three desired lines via gates 601, 701, or 801. Thus, for use in the substitution error correction mode, trigram store 119 has both inputs and outputs selectively gated by flip-flop 114 shown in FIG. 7. Similarly, in the two separate uses of the store during the blank error-correction mode, to be described hereinafter in connection with FIG. 9, activation of the appropriate enabling lines places the store under control of the desired circuit.

*Apparatus for correcting deletion errors*

Figure 9B:
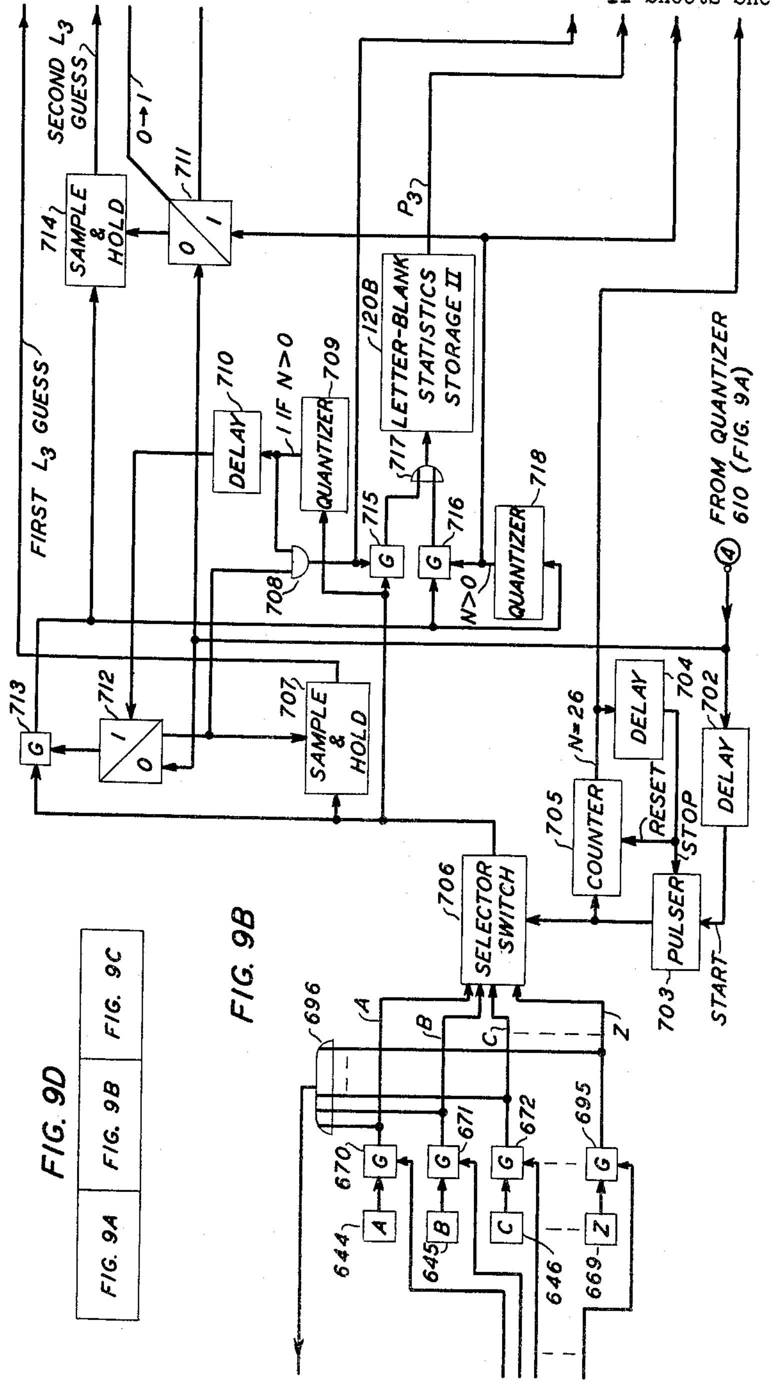

Apparatus for carrying out the operations for the correction of errors of omission, that is, deletions or blanks in a word, is shown in detail in FIGS. 9A, 9B, and 9C. These figures should be read together as indicated in FIG. 9D. This is principally an expansion of comparison and logic circuit 121 in the apparatus of FIG. 4.

A blank indicating that no decision has been made concerning a particular letter, is represnted by a five-bit symbol consisting of all "1's", i.e., the binary number 31. On the appearance of such a signal for a particular $L_3$ value, slicer 111 emits a "1" signal to turn on flip-flop 602 and to inhibit operation of the other sections of the system via inverter 112 and AND gate 697. As flip-flop 602 is turned on, its transient from "0" to "1" starts pulser 603 which causes stepping switch 606 to progress through its twenty-six positions. These operations will be recognized as being similar to those previously described for substitution-error correction in the apparatus of FIGS. 4 and 7. Obviously, common elements such as stepping switches, sample-and-hold units, peak selectors, and the like may be shared by various sections of the system. Selective switching may, if desired, be employed to use the same elements for various purposes as has been shown with the trigram storage unit. Except for that example, many redundant elements are utilized in the description of the apparatus particularly in FIG. 9 solely in the interest of simplicity of exposition.

The "on" state of flip-flop 602 enables gates 600 and 601 to utilize trigram probabilities storage 119 to examine a new set of $L_3$ guesses. These guesses are produced by letter-blank statistics storage 120A. This store is a part of store 120 shown in the complete system drawing of FIG. 4. Its contents are simply that information derived from the confusion matrix of FIG. 3 which indicates the possible antecedents for each blank and which is based on the prior performance record of the particular input source being used to supply information to the system. Thus as each alphabetic letter in turn interrogates store 120A only those letter symbols are read from the output which are possible antecedents for the blank. For example, if the A, B, C, or D input line is activated, there is no output, but if the E input line is activated the output is E indicating the presence of an entry in the matrix of the table of FIG. 3.

As each of the $L_3$ guesses are presented to trigram store 119 the corresponding probability $P_{234}$ is gated out of the store via gate 601 to that one of the sample-and-hold circuits 617 through 642 which corresponds to the particular letter symbol. Throughout the inspection at store 119 slicer 607 examines all $P_{234}$ signals and emits a "1" signal for each $P_{234}$ probability that is greater than zero. Counter 608 registers these signals. At the end of the scan cycle the count of twenty-six in counter 604 enables gate 609 to deliver the total count in counter 608 to quantizer 610. There are three possibilities: either the count has been 0, 1 or more than 1. A separate line for each case is available from quantizer 610. This provides the information required by the deletion-error correction procedures described above. There are three possible outcomes as follows:

(1) If all trigrams have zero probability, gate 612 is enabled and the stored quantity symbol 11111 corresponding to a blank indication is transferred from 611 to gate 109 via OR gate 613. Simultaneously gate 109 is enabled via OR gate 614 and so the unchanged representation of a blank is delivered to the output of the system.

(2) If only one trigram has a probability $P_{234} \searrow 0$ gate 615 is enabled. All of the information available in the sample-and-hold circuits 617 through 642 is simultaneously compared by peak selector 643 which energizes those two of its twenty-six output lines which correspond to the two highest probability $P_{234}$ signals at its output. In the present case, since only one $P_{234} \searrow 0$, a unique output line is activated. Thus one of the gates 670 through 695 is enabled to pass the appropriate letter representation (644 through 669) to OR gate 696. The required symbol is therefore gated via gate 615 through OR gate 613 into gate 109, which is now enabled via OR gate 614, and so on into the output system.

(3) If two or more trigrams have indicated a greater-than-zero probability, quantizer 610 energizes its output line which is connected to terminal 4.

Turning now to a consideration of the apparatus shown particularly in FIG. 9B, the active state of terminal 4 sets flip-flops 711 and 712 to the "0" state. After a delay to permit this clearing operation, pulser 703 begins to operate and continues to do so until stopped by the actions of counter 705 and delay 704. As pulser 703 operates it steps selector switch 706 along, picking off in turn each one of the numbers available from gates 670 through 695. There are just two nonzero numbers available due to the action of peak selector 643. These quantities correspond to the two best guess $L_3$ replacement values. When the first nonzero signal is picked up by selector switch 706 it is stored in sample-and-hold circuit 707. Also, it is sensed by quantizer 709 to enable fully AND gate 708. This acts to transmit the symbol representation to letter-blank statistics storage 120B via gate 715 and OR 717.

Store 120B is the second half of store 120 of FIG. 4. This unit contains information pertaining to the probability of a particular letter's being the antecedent of a blank. This is in contrast to the contents of store 120A which only contains binary statements of whether or not particular letters are ever antecedents of a blank.

The output of store 120B, $P_3$, is stored in sample-and-hold circuit 731 where it awaits further processing. At the next time interval, delay 710 sets flip-flop 712 to the "1" state thus preventing further action of the "first $L_3$ guess" circuit just described. With flip-flop 712 in the active state, gate 713 passes all subsequent signals delivered by selector switch 706. When one of these signals is nonzero, i.e., the second of the two symbols selected by peak selector 643, it is stored in sample-and-hold circuit 714. Quantizer 718 responds to this nonzero signal to enable gate 716 to present the "second $L_3$ guess" to store 120B. The corresponding probability is now stored in sample-and-hold circuit 733; that circuit being enabled by the output of quantizer 718.

The signal from quantizer 718 also acts to set flip-flop 711 to the "1" state and so to disable sample-and-hold circuit 714 from further action. This is done to prevent any subsequent zero signal obtained via selector switch 706 from destroying the significant contents of the hold circuit. As flip-flop 711 is set to its active state, the transient signal developed as it transfers from the "0" to the "1" state initiates the final stage of the process. This signal starts pulser 739 which steps along sequential selector 719 and, in synchronism, stepping switch 720. Selector 719 is a simple sequential switching arrangement which takes its inputs three at a time and presents them on the three output lines. The six sequences thus produced are $L_1L_2L_{3(1)}$, $L_2L_{3(1)}L_4$, $L_{3(1)}L_4L_5$, $L_1L_2L_{3(2)}$, $L_2L_{3(2)}L_4$, and $L_{3(2)}L_4L_5$.

Each of these six trigrams are gated (via gates 700*a*, 700*b*, and 700*c* which are enabled by the "1" state of flip-flop 711) into store 119 to evoke six probabilities of the form $P_{n-1, n, n+1}$. These six quantities are stored in sample-and-hold circuits 721 through 726 (via gate 701) which are enabled sequentially by the synchronously operating stepping switch 720. The pulser output also feeds into counter 740 which emits a "1" signal when the count reaches six. After passing through delay 741, this signal stops pulser 739 and resets counter 740. Simultaneously, via terminal 8 and OR gate 614, the $n=6$ signal enables the output system gate (109 FIG. 4B).

The quantities in hold circuits 721 through 726 represent the trigram probabilities required in the calculations discussed above. The "blank" probabilities which are also required now reside in hold circuits 731 and 733. The product of the three trigram and the blank probabilities using the first $L_3$ guess is formed by multipliers 727, 729, and 732. The product formed by using the second $L_3$ guess is formed by multipliers 728, 730, and 734. These two products $P_1'$ and $P_2'$ are compared by comparator 735, which is enabled at the end of the full sweep cycle. The highest product enables the appropriate gate either 736 or 738 to pass the letter representation from the responsible hold circuit either 707 or 714 to terminal 6 via OR gate 737. This information is in turn passed through OR gate 613 to the enabled gate 109 and so to the output circuit as a blank error correction.

While the apparatus described above has been directed primarily to the correction of single letter errors in sequences purported to be English text, the principles involved are, of course, equally applicable to multiple letter errors. Although considerably more apparatus, primarily in the form of storage and logic elements, is required for implementing such a system, the development of such apparatus by those skilled in the art will become readily apparent from the single letter implementation described herein.

Further, it is obvious that various other features and combinations of features may be employed as well to vary slightly the sequence or modes of correction within the scope and spirit of the present invention.

What is claimed is:

1. Apparatus for detecting and locating errors in electrical representations of meaningful combinations of patterns comprising means for systematically forming selected combinations of coded electrical notations of discrete patterns, means for identifying those of said selected combinations for which the probability of occurrence of those combinations in a meaningful language is below a pre-established threshold, and means for designating that one pattern notation in each one of said identified combinations as an error whose coded electrical notation when identified in one of said combinations only is statistically prone to error and whose coded electrical notation when identified in more than one of said combinations of a meaningful language is common to at least two of said combinations.

2. Apparatus for detecting single letter errors in mutilated English text comprising means for transforming electrical analog representations of English letters into a coded sequence of pulses, means for comparing selected sequences of pulses representative of letter combinations repeatedly with each of a plurality of stored combinations of pulse sequences representing natural frequencies of occurrence of various combinations of letters in English text, means for deriving from said comparisons a measure of the probability of occurrence in English text of each selected sequence of pulses in the context of letters represented by said several sequences, means for weighting said measures of probability according to a pre-established schedule of error probabilities in said analog representations of English letters, and means for locating and identifying as an errant letter, each of said sequences of pulses for which said measure of probability of occurrence fails to exceed a pre-established threshold, said locating and identifying means including means for distinguishing between contexually errant letters and contextually correct letters on the basis of the probability figure associated with sequences of pulses which include the code sequence representative of the letter indicated to be in error.

3. Apparatus for automatically locating and correcting errors in sequences of symbols otherwise arranged in a meaningful order comprising means for transforming electrical representations of symbols into coded sequences of pulses, means for comparing selected sequences of pulses repeatedly with each of a plurality of stored combinations of pulse sequences representing the statistics of natural occurrence of various combinations of symbols, means for deriving from said repeated comparisons a measure of the probability of occurrence of each selected sequence of pulses, means for weighting said measures of probability according to a pre-established schedule of probable errors in said electrical representations, and means for replacing each entire sequence of pulses for which said measure of probability of occurrence fails to exceed a pre-established threshold, with a sequence representative of a symbol whose probability of occurrence exceeds said threshold.

4. Apparatus for detecting, locating, and correcting errors in sequences of symbols otherwise arranged in a meaningful order comprising, means for transforming manifestations descriptive of discrete symbols into electrical representations of said symbols, means for systematically comparing each one of a plurality of selected sequences of said representations repeatedly with each of a plurality of stored notations of the probability of natural occurrence of various sequences of symbols, means responsive to said comparisons for detecting those sequences of symbol representations whose probability of occurrence falls below a preselected threshold, means for isolating said detected electrical symbol sequences, said isolated sequences being statistically most probably in error, means for isolating that single symbol representation in said isolated erroneous sequence which is most likely to be in error, said last-mentioned isolation means being responsive to the statistical probability record of error in said manifestations of discrete symbols and to the occurrence of erroneous symbols in related below-threshold sequences of symbol representatives, and means responsive to said probability record of error for substituting for each of said erroneous symbol representations that symbol representation which forms the sequence of pattern representations possessing the highest probability of occurrence above said threshold.

5. Apparatus for automatically locating and correcting single letter errors in mutilated English text comprising means for transforming electrical representations of English letters into a coded sequence of pulses, means for comparing selected sequences of pulses representative of letter combinations repeatedly with each of a plurality of stored combinations of pulse sequences representing natural frequencies of occurrence of various combinations of letters in English text, means for deriving from said comparisons a measure of the probability of occurrence in English text of each selected sequence of pulses in the context of letters represented by said several sequences, means for weighting said measures of probability according to a pre-established schedule of error probabilities in said analog representations of English letters, and means for replacing each entire sequence of pulses for which said measure of probability of occurrence fails to exceed a pre-established threshold, with a sequence representative of a letter whose probability of occurrence exceeds said threshold.

6. Apparatus for processing electrical representations of meaningful combinations of patterns comprising: (1) a source of electrical notations of individual patterns; (2) means for detecting individual pattern errors in said combinations of patterns including, means for developing coded electrical notations of the individual patterns of a combination, means for systematically forming a plurality of digrams of said notations, means for obtaining representations of the natural likelihood of occurrence of said digrams from preregistered digram probability data, and means for designating each digram that fails to exceed a pre-assigned threshold of probability as one in error; (3) means for locating that pattern of a given digram whose probability lies below threshold including, first means for selecting that pattern combination common to two adjacent digrams below threshold as the pattern in error, second means responsive to a failure of said first selecting means to locate said pattern in error for selecting that one pattern from a preregistered table of probabilities of error for single patterns, third means responsive to a failure of said second selecting means to locate said pattern in error for selecting other digram combinations of said individual pattern notations to determine that one of said other digrams that has the lowest probability of natural occurrence, and fourth means responsive to a failure of said third selecting means to locate said pattern in error for selecting that pattern representation as the pattern in error that is designated to be a blank; and (4) means for correcting located pattern errors including, means for developing coded electrical notations of all of the possible antecedent patterns which, according to preregistered statistical data, most probably give rise to the pattern indicated to be in error, said antecedent patterns being derived from known past performance records of said source of electrical notations of individual patterns, means for systematically forming a plurality of trigrams each of which includes one of said antecedent patterns, means for obtaining representations of the natural likelihood of occurrence of said trigrams from preregistered trigram probability data, fifth means for selecting as the correct antecedent pattern that pattern included in the trigram which has the highest indicated likelihood of occurrence, means responsive to a failure of said fifth means to select a correct antecedent pattern for forming a plurality of digrams each of which includes one of said antecedent patterns, means for obtaining representations of the natural likelihood of occurrence of said digrams from preregistered digram probability data, sixth means for selecting as the correct antecedent pattern that pattern included in the one of said last-formed digrams which has the highest indicated likelihood of natural occurrence; and in the event that said fourth selecting means selected a blank as the pattern in error and consequently that said fifth and sixth selecting means indicate a failure to select a correct antecedent pattern, means for developing coded electrical notations of all of the possible antecedent patterns which, according to preregistered data, most probably give rise to a blank, means for forming a plurality of trigrams each of which includes one of said antecedent patterns indicated most likely to give rise to a blank, means for obtaining representations of the probability of the natural likelihood of each of said last-mentioned antecedent patterns being transformed into a blank by said source of electrical notations of individual patterns in accordance with its statistical record of performance, means for forming the joint probabilities of said trigram probabilities with said probabilities of a given antecedent pattern being transformed into a blank, and seventh means for selecting as the correct antecedent pattern that one included in said last-mentioned plurality of trigrams that has the highest joint probability.

7. In combination: means for detecting errors in sequences of letters assembled in a meaningful order, said detecting means including means for systematically developing measures of the probabilities of occurrence in natural sequences of individual multiple letter combinations of a sequence of letters in a meaningful order, and means for detecting letter combinations for which said probability measures fail to show a likelihood of occurrence which exceeds a preselected threshold value; means for locating errors in sequences of letters assembled in a meaningful order, said locating means including means for comparing detected below threshold letter combinations with stored records indicating the relative accuracy with which like letter combinations are supplied by the source of said sequences of letters, and means for designating that letter of each of said detected letter combinations as errant that is indicated by said comparisons to have the highest probability of being in error in that combination of letters; and means for correcting located errant letters in said individual multiple letter combinations, said correcting means including means for selecting from said stored records of the accuracy with which said sequences of letters are supplied by said source the letter indicated to be that one letter most regularly substituted for said errant letter, and if no such letter is indicated, for selecting said letter indicated as errant with the letter statistically indicated to yield the highest natural letter combination probability of occurrence in the context of said sequences, and means for replacing said letter indicated as errant with said selected letter.

References Cited by the Examiner

UNITED STATES PATENTS 2,915,966 12/59 Jacoby ---------- 340—146.1 XR

MALCOLM A. MORRISON, *Primary Examiner.*